United States Patent
Park et al.

(10) Patent No.: US 9,386,505 B2
(45) Date of Patent: Jul. 5, 2016

(54) SYSTEMS AND METHODS FOR SECONDARY CELL ID SELECTION

(71) Applicant: Sharp Laboratories of America, Inc., Camas, WA (US)

(72) Inventors: Kenneth James Park, Cathlamet, WA (US); Shohei Yamada, Camas, WA (US); John Michael Kowalski, Camas, WA (US); Zhanping Yin, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 115 days.

(21) Appl. No.: 14/253,780

(22) Filed: Apr. 15, 2014

(65) Prior Publication Data

US 2015/0296486 A1 Oct. 15, 2015

(51) Int. Cl.
*H04W 72/04* (2009.01)
*H04W 48/00* (2009.01)
*H04W 76/02* (2009.01)
*H04W 16/14* (2009.01)
*H04W 28/18* (2009.01)

(52) U.S. Cl.
CPC ............ *H04W 48/00* (2013.01); *H04W 76/025* (2013.01); *H04W 16/14* (2013.01); *H04W 28/18* (2013.01)

(58) Field of Classification Search
CPC .................................................. H04W 76/025
See application file for complete search history.

(56) References Cited

U.S. PATENT DOCUMENTS

| 2004/0192211 | A1* | 9/2004 | Gallagher | H04M 3/42246 455/67.11 |
| 2010/0278107 | A1* | 11/2010 | Vikberg | H04L 12/5691 370/328 |
| 2013/0003673 | A1* | 1/2013 | Dinan | H04W 72/0406 370/329 |
| 2013/0039331 | A1 | 2/2013 | Koorapaty et al. | |
| 2013/0114576 | A1* | 5/2013 | Kwon | H04L 5/001 370/336 |
| 2013/0155991 | A1 | 6/2013 | Kazmi et al. | |
| 2014/0071901 | A1* | 3/2014 | Sundberg | H04W 72/0453 370/329 |
| 2014/0092866 | A1* | 4/2014 | Teyeb | H04W 76/045 370/331 |
| 2015/0098397 | A1* | 4/2015 | Damnjanovic | H04W 52/02 370/329 |
| 2015/0146542 | A1* | 5/2015 | Xia | H04W 24/00 370/241.1 |
| 2015/0280847 | A1* | 10/2015 | Somasundaram | H04J 11/0056 370/252 |

FOREIGN PATENT DOCUMENTS

| WO | 2013074458 | 5/2013 |
| WO | 2013174800 | 11/2013 |
| WO | 2014027324 | 4/2014 |

* cited by examiner

*Primary Examiner* — John Blanton
(74) *Attorney, Agent, or Firm* — Austin Rapp & Hardman

(57) ABSTRACT

A method performed by a user equipment (UE) is described. The method includes receiving a physical cell identifier information element (IE) from an evolved node B (eNB). The physical cell identifier IE is associated with a secondary cell (SCell) that is on an unlicensed Long-Term Evolution (LTE) carrier frequency. The method also includes determining a physical-layer cell identity (PCI) of the SCell based on the physical cell identifier IE. The method further includes applying the PCI as a parameter for physical channels or signals on the SCell.

25 Claims, 11 Drawing Sheets

SYSTEMS AND METHODS FOR SECONDARY CELL ID SELECTION

TECHNICAL FIELD

The present disclosure relates generally to communication systems. More specifically, the present disclosure relates to systems and methods for secondary cell (SCell) ID selection.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, a wireless communication device transmitting in unlicensed spectrum may interfere with other wireless devices. To avoid transmission conflicts in unlicensed spectrum, wireless communication devices may wait until a channel is idle before transmitting. However, wireless communication devices operating in a Long-Term Evolution (LTE) communication system may transmit nearly continuously. Therefore, LTE devices may interfere with other wireless communication devices operating in unlicensed spectrum. As illustrated by this discussion, systems and methods that reduce interference may be beneficial.

DETAILED DESCRIPTION

Figure 1:
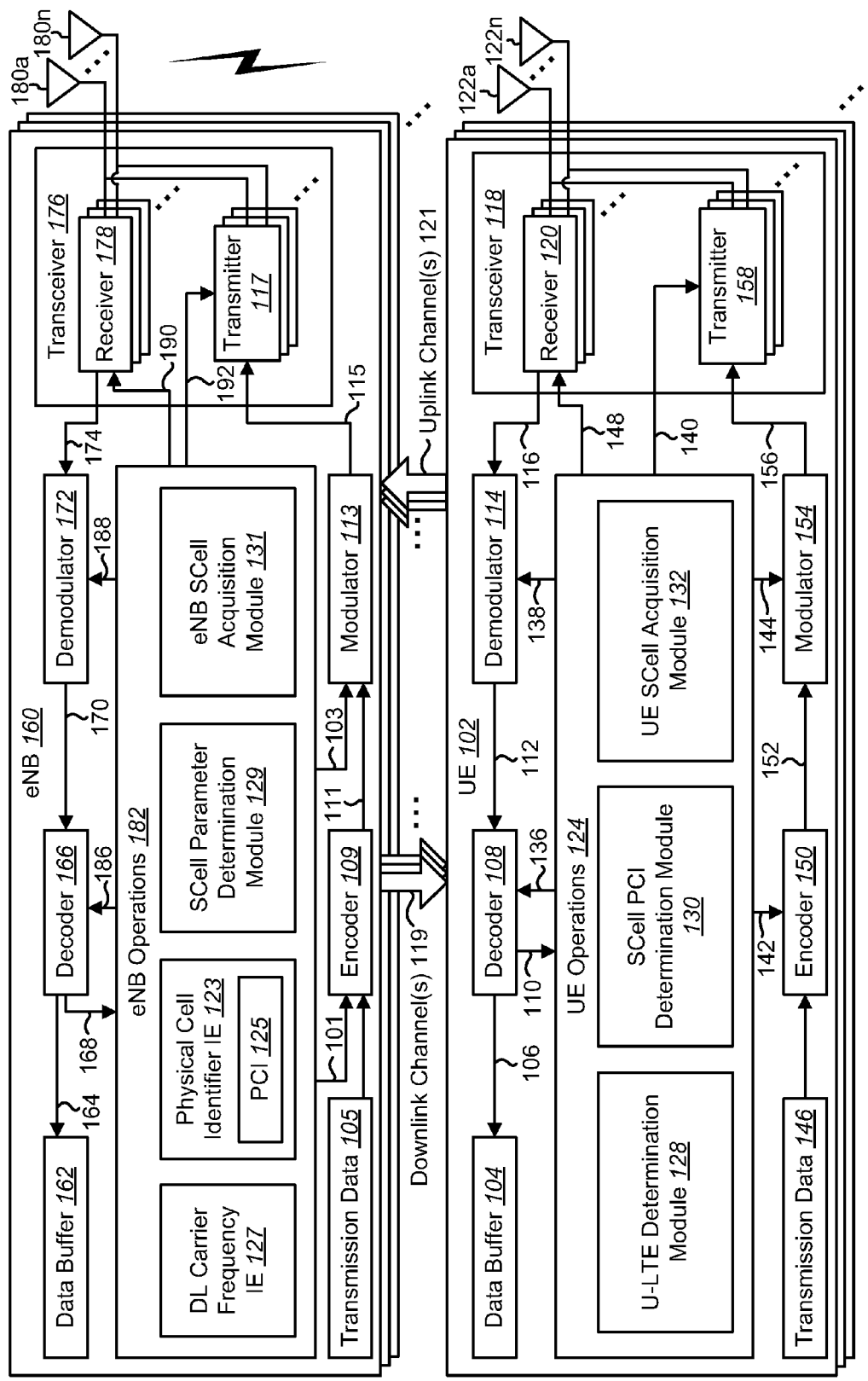
FIG. 1 is a block diagram illustrating one configuration of one or more eNBs and one or more UEs in which systems and methods for SCell ID selection may be implemented.

A method performed by a user equipment (UE) is described. The method includes receiving a physical cell identifier information element (IE) from an evolved node B (eNB). The physical cell identifier IE is associated with a secondary cell (SCell) that is on an unlicensed Long-Term Evolution (LTE) carrier frequency. The method also includes determining a physical-layer cell identity (PCI) of the SCell based on the physical cell identifier IE. The method further includes applying the PCI as a parameter for physical channels or signals on the SCell.

The method may also include determining that the SCell is on an unlicensed LTE carrier frequency based on a downlink carrier frequency IE received from the eNB. Determining that the SCell is on an unlicensed LTE carrier frequency may include obtaining an absolute radio frequency channel number (ARFCN) of the SCell from the downlink carrier frequency IE. The method may also include determining that the ARFCN corresponds to an unlicensed LTE carrier frequency. Determining that the ARFCN corresponds to an unlicensed LTE carrier frequency may include performing a table lookup using the ARFCN to obtain a carrier frequency associated with the SCell.

The physical cell identifier IE may be a physCellId-r10 IE. The downlink carrier frequency IE may be one of a dl-CarrierFreq-r10 IE or a dl-CarrierFreq-v1090 IE. The physical cell identifier IE and the downlink carrier frequency IE may be included in an sCellToAddModList-r10 IE.

The method may also include determining that the SCell is on an unlicensed LTE carrier frequency based on receiving an IE from the eNB based on an indication that the SCell is on an unlicensed LTE carrier frequency.

Determining the PCI of the SCell may include obtaining the PCI of the SCell from the physical cell identifier IE. Applying the PCI as a parameter for physical channels or signals on the SCell may include performing scramble sequence initialization based on the PCI of the SCell.

The method may also include assuming that no primary synchronization signal (PSS) or secondary synchronization signal (SSS) are transmitted by the SCell. The method may further include assuming that the SCell and a primary cell (PCell) are synchronized at least in time.

A method performed by an eNB is described. The method includes determining a PCI of a SCell that is on an unlicensed LTE carrier frequency. The method also includes sending a physical cell identifier IE for the PCI of the SCell to a UE. The method further includes applying the PCI as a parameter for physical channels or signals on the SCell.

The method may also include assuming that the UE determines that the SCell is on an unlicensed LTE carrier frequency based on a downlink carrier frequency IE sent to the UE. Determining that the SCell is on an unlicensed LTE carrier frequency comprises obtaining an ARFCN of the SCell from the downlink carrier frequency IE. Determining that the SCell is on an unlicensed LTE carrier frequency also comprises determining that the ARFCN corresponds to an unlicensed LTE carrier frequency. Determining that the ARFCN corresponds to an unlicensed LTE carrier frequency comprises performing a table look-up using the ARFCN to obtain a carrier frequency associated with the SCell.

The method may also include sending, to the UE, an indication that the SCell is on an unlicensed LTE carrier frequency.

The PCI of the SCell may be included in the physical cell identifier IE. Applying the PCI as a parameter for physical channels or signals on the SCell may include performing scramble sequence initialization based on the PCI of the SCell.

The SCell may not transmit a PSS or an SSS. The SCell and a PCell may be synchronized at least in time.

A UE is also described. The UE includes a processor and memory in electronic communication with the processor. The instructions stored in the memory are executable by the processor to receive a physical cell identifier IE from an eNB. The physical cell identifier IE is associated with an SCell that is on an unlicensed LTE carrier frequency. The instructions are also executable to determine a PCI of the SCell based on the physical cell identifier IE. The instructions are further executable to apply the PCI as a parameter for physical channels or signals on the SCell.

An eNB is also described. The eNB includes a processor and memory in electronic communication with the processor. The instructions stored in the memory are executable by the processor to determine a PCI of an SCell that is on an unlicensed LTE carrier frequency. The instructions are also executable to send a physical cell identifier IE for the PCI of the SCell to a UE. The instructions are further executable to apply the PCI as a parameter for physical channels or signals on the SCell.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a user equipment (UE), an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device (e.g., UE) and/or a base station (e.g., eNB).

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may consist of a primary cell and/or no, one or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). It should be noted that in some configurations, a secondary cell (SCell) may not monitor a PDCCH. For example, during cross carrier scheduling of an SCell by a primary cell (PCell), information (e.g., one or more bits in a carrier indicator field (CIF)) in the PDCCH of the PCell may indicate that the PDCCH received by the PCell is for the SCell.

"Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

Carrier aggregation refers to the concurrent utilization of more than one carrier. In carrier aggregation, more than one cell may be aggregated to a UE. In one example, carrier aggregation may be used to increase the effective bandwidth available to a UE. It should be noted that the term "concurrent" and variations thereof as used herein may denote that two or more events may overlap each other in time and/or may occur near in time to each other. Additionally, "concurrent" and variations thereof may or may not mean that two or more events occur at precisely the same time.

When carrier aggregation (CA) is configured, the UE may have one radio resource control (RRC) connection with the network. One radio interface may provide carrier aggregation. During RRC connection establishment, re-establishment and handover, one serving cell may provide non-access stratum (NAS) mobility information (e.g., a tracking area identity (TAI)). During RRC connection re-establishment and handover, one serving cell may provide a security input. This cell may be referred to as the primary cell (PCell). In the downlink, the component carrier corresponding to the PCell may be the downlink primary component carrier (DL PCC), while in the uplink it may be the uplink primary component carrier (UL PCC).

Depending on UE capabilities, one or more secondary cells (SCells) may be configured to form together with the PCell a set of serving cells. In the downlink, the component carrier corresponding to a SCell may be a downlink secondary component carrier (DL SCC), while in the uplink it may be an uplink secondary component carrier (UL SCC).

The configured set of serving cells for the UE, therefore, may consist of one PCell and one or more SCells. For each SCell, the usage of uplink resources by the UE (in addition to the downlink resources) may be configurable. The number of DL SCCs configured may be larger than or equal to the number of UL SCCs and no SCell may be configured for usage of uplink resources only.

From a UE viewpoint, each uplink resource may belong to one serving cell. The number of serving cells that may be configured depends on the aggregation capability of the UE. The PCell may only be changed using a handover procedure (e.g., with a security key change and a random access channel (RACH) procedure). The PCell may be used for transmission of the PUCCH. Unlike the SCells, the PCell may not be deactivated. Re-establishment may be triggered when the PCell experiences radio link failure (RLF), not when the SCells experience RLF. Furthermore, NAS information may be taken from the PCell.

The reconfiguration, addition and removal of SCells may be performed by an RRC. At intra-LTE handover, RRC may also add, remove or reconfigure SCells for usage with a target PCell. When adding a new SCell, dedicated RRC signaling may be used for sending all required system information of the SCell (e.g., while in connected mode, UEs need not acquire broadcasted system information directly from the SCells).

A frequency division duplexing (FDD) cell requires spectrum (e.g., radio communication frequencies or channels) in which contiguous subsets of the spectrum are entirely allocated to either uplink (UL) or downlink (DL) but not both. Accordingly, FDD may have carrier frequencies that are paired (e.g., paired DL and UL carrier frequencies).

A time division duplexing (TDD) cell does not require paired channels. Instead, TDD may allocate UL and DL resources on the same carrier frequency. Therefore, TDD may provide more flexibility on spectrum usage. With the increase in wireless network traffic, and as spectrum resources become very precious, new allocated spectrum tends to be fragmented and has smaller bandwidth, which is more suitable for TDD and/or small cell deployment. Furthermore, TDD may provide flexible channel usage through traffic adaptation with different TDD UL/DL configurations and dynamic UL/DL re-configuration.

In some configurations, the cells involved with carrier aggregation may utilize a TDD uplink-downlink (UL/DL) configuration, and FDD configuration or both. The same TDD UL/DL configuration has to be used for TDD CA in Release-10, and for intra-band CA in Release-11. In Release-11, inter-band TDD CA with different TDD UL/DL configurations is supported. Support for carrier aggregation between TDD and FDD cells (also referred to as TDD-FDD CA, hybrid CA or hybrid duplexing networks) was introduced in 3GPP Release-12. The inter-band TDD CA with different TDD UL/DL configurations may provide the flexibility of a TDD network in CA deployment. Furthermore, enhanced interference management with traffic adaptation (eIMTA) (also referred to as dynamic UL/DL reconfiguration) may allow flexible TDD UL/DL reconfiguration based on the network traffic load.

With TDD CA and hybrid duplexing networks, the macro cells and pico/small cells may use different frequency bands. A frequency band is a small section of the spectrum, in which communication channels may be established. For example, in a typical CA case, the macro cell may use a lower frequency band and the pico/small cell may use a higher frequency band. For hybrid duplexing networks, a possible combination is to have FDD on a macro cell and TDD on a pico/small cell.

More spectrum is needed for cellular operators to meet the increasing traffic demand. Although licensed spectrum is preferred by the cellular operators to provide guaranteed quality of service (QOS) to the user, unlicensed spectrum can be considered as an effective complement. In some configurations, unlicensed spectrum may include industrial, scientific and medical (ISM) radio bands or the Unlicensed National Information Infrastructure (UNIT) bands. For example, some center frequencies of the unlicensed spectrum may include, but are not limited to, 2.4 gigahertz (GHz) and 24.0 GHz. The UNIT bands may include, but are not limited to, the 5.15-5.25 GHz, and 5.725-5.825 GHz bands.

Other communication systems or electrical devices may operate using unlicensed spectrum. For example, low power communication systems may use unlicensed spectrum for communication. These communication systems may include cordless phones, near field communication (NFC) devices, Bluetooth devices, and wireless computer networks (e.g., IEEE 802.11ac, Wi-Fi, etc.). If LTE is deployed in unlicensed spectrum, coexistence with primary users of that unlicensed spectrum (if they exist) needs to be carefully considered to ensure that existing users of the shared spectrum are not negatively impacted by the use of the spectrum by LTE. For example, certain radar systems may be transmitting in a portion of the Unlicensed National Information Infrastructure spectrum. It is also desirable to minimize interference between LTE and existing communication systems that may be using the same spectrum.

Some communication systems (e.g., Wi-Fi) may use carrier sense multiple access/collision avoidance (CSMA/CA) to avoid collisions between transmitting nodes by transmitting only when a channel in unlicensed spectrum is sensed to be idle. The CSMA/CA node may determine that the channel is idle by first listening to the shared spectrum (e.g., listening for wireless signals in a wireless network) to determine whether another node is transmitting or not. If another node is heard, the listening node will wait for a period of time for the transmitting node to stop transmitting before listening again for a free communications channel. If the listening node determines the shared spectrum as being clear, it begins transmitting on the shared spectrum.

In LTE, cell synchronization may be the first step taken by a UE when the UE attempts to camp on a cell. From the synchronization process, the UE acquires the physical-layer cell identity (PCI), time slot and frame synchronization of that cell. These parameters may enable the UE to decode and read fundamental data and UE-specific data. The fundamental data may include data or information associated with one or more of a physical downlink shared channel (PDSCH), a physical broadcast channel (PBCH), a physical control format indicator channel (PCFICH), a physical downlink control channel (PDCCH) and a physical hybrid ARQ indicator channel (PHICH), etc. The UE-specific data may include data or information associated with a PDSCH from the cell.

If the UE is attempting to acquire/tune a specific band/channel, the UE may first find the primary synchronization signal (PSS) transmitted by an eNB. The PSS may be located in the last orthogonal frequency division multiplexing (OFDM) symbol of first time slot of the first subframe (subframe 0) of radio frame. The PSS may enable UE to be synchronized on subframe level. The PSS may be repeated in subframe 5, which means the UE is synchronized on a 5 millisecond (ms) basis since each subframe is 1 ms. Using the PSS, the UE may also obtain a physical layer identity (0 to 2).

In the next step, the UE may find the secondary synchronization signal (SSS). SSS symbols are also located in the same subframe of PSS but in the symbol before PSS. Using the SSS, the UE may obtain physical layer cell identity group number (0 to 167).

Using physical layer identity and cell identity group number, the UE may determine the PCI for the cell that the UE is tuned to. In LTE, there are 504 PCIs allowed. The PCIs may be divided into unique 168 cell layer identity groups. Each group may consist of three physical layer identities. In one example for a given cell, assuming a physical layer identity is 1 and a cell identity group is 2, then the PCI for the given cell is obtained by the equation PCI=3*(Physical layer cell identity group)+(physical layer identity)=3*2+1=7.

There are 504 unique physical-layer cell identities (PCIs). The PCIs are grouped into 168 unique physical-layer cell-identity groups, each group containing three unique identities. The grouping is such that each PCI is part of one and only one physical-layer cell-identity group. A PCI $N_{ID}^{cell} = 3N_{ID}^{(1)} + N_{ID}^{(2)}$ is thus uniquely defined by a number $N_{ID}^{(1)}$ in the range of 0 to 167, representing the physical-layer cell-identity group, and a number $N_{ID}^{(2)}$ in the range of 0 to 2, representing the physical-layer identity within the physical-layer cell-identity group. For a PCell and other SCells that are not on unlicensed LTE carrier frequency, the physical-layer identity of the serving cell is included in synchronization signals including primary synchronization signal (PSS) and secondary synchronization signal (SSS). For the PCell and other SCells that are not on unlicensed LTE carrier frequency, the physical-layer identity of the serving cell is detected by the UE based on synchronization signals of the serving cell. For measurement for neighbor cells that are not on unlicensed LTE carrier frequency, the physical-layer identity of the neighbor cell is detected by the UE based on synchronization signals of the neighbor cell.

Once the UE determines the PCI for a given cell, the UE may also determine the location of cell reference signals. The UE may further use the PCI to decode the fundamental data of the cell and UE-specific data that is transmitted on the cell and is scrambled (e.g., encoded).

In some configurations of 3GPP, LTE may be deployed in unlicensed spectrum (e.g., 2.4 GHz ISM and 5.8 GHz UNIT bands). In other words, LTE may utilize cells that are on unlicensed LTE carrier frequencies. As used herein, the use of unlicensed spectrum by a UE configured with LTE may be referred to as U-LTE or LTE-U.

The use of CSMA/CA by a wireless communication system (e.g., Wi-Fi) to sense that the shared medium is available means that all nodes should not inject radio frequency (RF) into the shared medium while idle. If a node transmits in a shared medium, the shared medium will appear busy. On the other hand, LTE eNBs may transmit PSS and SSS in a nearly continuous manner in the shared medium. Thus, if an LTE eNB was to transmit its protocol (in its current configuration) in unlicensed spectrum that relies on CSMA/CA (e.g., the ISM band), the nearly continuous PSS/SSS transmission would cause other CSMA/CA nodes (e.g., Wi-Fi nodes) also using that shared medium to determine that the shared medium is always busy. This may prevent the CSMA/CA nodes from ever accessing the shared medium. Furthermore, in some areas of the UNIT band it is required that a Channel Availability Check be performed to detect radars that are the primary users of the band; in this case it may not be beneficial to transmit PSS and/or SSS continuously in time. However, if the LTE UE is not able to access the PSS and/or SSS of the LTE cell, the UE cannot determine the PCI of the cell, and may not decode any of the fundamental and UE-specific data transmitted from the cell.

A UE may benefit from performing carrier aggregation with an SCell on an unlicensed LTE carrier frequency. Thus, the UE must be able to obtain the PCI of the SCell operating in the unlicensed spectrum (e.g., ISM band) by some means other than receiving the PSS and/or SSS from a transmission from the SCell. Furthermore, a slightly modified 3GPP LTE protocol may be used in frequency bands that are not specifically licensed for use by LTE. These unlicensed frequency bands may be currently used by other radio access technologies (RATs) (e.g., Wi-Fi) that rely on CSMA/CA.

Various examples of the systems and methods disclosed herein are now described with reference to the figures, where like reference numbers may indicate functionally similar elements. The systems and methods as generally described and illustrated in the figures herein could be arranged and designed in a wide variety of different implementations. Thus, the following more detailed description of several implementations, as represented in the figures, is not intended to limit scope, as claimed, but is merely representative of the systems and methods.

FIG. 1 is a block diagram illustrating one configuration of one or more eNBs 160 and one or more UEs 102 in which systems and methods for SCell ID selection may be implemented. The one or more UEs 102 communicate with one or more eNBs 160 using one or more antennas 122a-n. For example, a UE 102 transmits electromagnetic signals to the eNB 160 and receives electromagnetic signals from the eNB 160 using the one or more antennas 122a-n. The eNB 160 communicates with the UE 102 using one or more antennas 180a-n.

It should be noted that in some configurations, one or more of the UEs 102 described herein may be implemented in a single device. For example, multiple UEs 102 may be combined into a single device in some implementations. Additionally or alternatively, in some configurations, one or more of the eNBs 160 described herein may be implemented in a single device. For example, multiple eNBs 160 may be combined into a single device in some implementations. In the context of FIG. 1, for instance, a single device may include one or more UEs 102 in accordance with the systems and methods described herein. Additionally or alternatively, one or more eNBs 160 in accordance with the systems and methods described herein may be implemented as a single device or multiple devices.

The UE 102 and the eNB 160 may use one or more channels 119, 121 to communicate with each other. For example, a UE 102 may transmit information or data to the eNB 160 using one or more uplink channels 121 and signals. Examples of uplink channels 121 include a physical uplink control channel (PUCCH) and a physical uplink shared channel (PUSCH), etc. Examples of uplink signals include a demodulation reference signal (DMRS) and a sounding reference signal (SRS), etc. The one or more eNBs 160 may also transmit information or data to the one or more UEs 102 using one or more downlink channels 119 and signals, for instance. Examples of downlink channels 119 include a PDCCH, an EPDCCH, a PDSCH, etc. Examples of downlink signals include a primary synchronization signal (PSS), a cell-specific reference signal (CRS), a UE-specific Reference Signal (DM-RS) associated with PDSCH, a DeModulation Reference Signal (DM-RS) associated with EPDCCH, a Positioning Reference Signal (PRS), and a channel state information (CSI) reference signal (CSI-RS), etc. Other kinds of channels or signals may be used.

Each of the one or more UEs 102 may include one or more transceivers 118, one or more demodulators 114, one or more decoders 108, one or more encoders 150, one or more modulators 154, one or more data buffers 104 and one or more UE operations modules 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the eNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce one or more decoded signals 106, 110. For example, a first UE-decoded signal 106 may comprise received payload data, which may be stored in a data buffer 104. A second UE-decoded signal 110 may comprise overhead data and/or control data. For example, the second UE-decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with the one or more eNBs 160. The UE operations module 124 may include one or more of a U-LTE determination module 128, an SCell PCI determination module 130 and a UE SCell acquisition module 132.

The U-LTE determination module 128 may determine that an SCell is on an unlicensed LTE (U-LTE) carrier frequency. In some configurations, LTE may be deployed in unlicensed spectrum (e.g., 2.4 GHz and 5.8 GHz ISM bands), as described above. To avoid conflicts with other devices (e.g., CSMA/CA devices) using a shared unlicensed medium, the eNB 160 may not transmit a PSS or an SSS on an SCell that is on an unlicensed LTE carrier frequency. Alternatively, to avoid conflicts with other devices (e.g., CSMA/CA devices) using a shared unlicensed medium, the eNB 160 may transmit a PSS or an SSS on an SCell that is on an unlicensed LTE carrier frequency only at allowable occasions. Therefore, the UE 102 must be able to obtain the PCI 125 of the SCell operating in the unlicensed spectrum by some means other than receiving the PSS and/or SSS from a transmission from the SCell.

In one configuration, the U-LTE determination module 128 may determine that the SCell is on an unlicensed LTE carrier frequency based on a downlink (DL) carrier frequency IE 127 received from the eNB 160. The U-LTE determination module 128 may obtain an absolute radio frequency channel number (ARFCN) of the SCell from the DL carrier frequency IE 127. The U-LTE determination module 128 may then perform a table look-up using the ARFCN of the SCell to determine whether the SCell is on an unlicensed LTE carrier frequency.

In one configuration, the DL carrier frequency IE 127 may be one of a dl-CarrierFreq-r10 IE or a dl-CarrierFreq-v1090 IE. The DL carrier frequency IE 127 may be included in an SCell addition IE. For example, the SCell addition IE may be an sCellToAddModList-r10 IE.

In another configuration, the U-LTE determination module 128 may determine that the SCell is on an unlicensed LTE carrier frequency based on an indication received from the eNB 160. The indication may be an information element that indicates that the SCell is on an unlicensed LTE carrier frequency.

If the SCell is on an unlicensed LTE carrier frequency, the SCell PCI determination module 130 may determine the PCI 125 of the SCell based on a physical cell identifier IE 123. The SCell PCI determination module 130 may receive the physical cell identifier IE 123 from the eNB 160. In one configuration, the physical cell identifier IE 123 may be included in the SCell addition IE. If the U-LTE determination module 128 determines that the SCell is on an unlicensed LTE carrier frequency, then the SCell PCI determination module 130 may obtain the PCI 125 of the SCell from the physical cell identifier IE 123. In one configuration, the physical cell identifier IE 123 may include the PCI 125 of the SCell as an entry in a data field.

The UE SCell acquisition module 132 may apply the PCI 125 as a parameter for physical channels or signals on the SCell. The physical channels may include one or more of the PDSCH, PBCH, PCFICH, PDCCH and PHICH. The physical signals may include one or more of the reference signals and the synchronization signals. The reference signals may include one or more of cell-specific reference signal (CRS), MBSFN reference signal, UE-specific Reference Signal (DM-RS) associated with PDSCH, DeModulation Reference Signal (DM-RS) associated with EPDCCH, Positioning Reference Signal (PRS), and CSI Reference Signal (CSI-RS). The synchronization signals may include one or more of a primary synchronization signal (PSS) and a secondary synchronization signal (SSS). There are 504 unique physical-layer cell identities (PCIs). For example, the UE SCell acquisition module 132 may perform scramble sequence initialization with the eNB 160 based on the PCI 125 of the SCell. In one configuration, a scrambling sequence generator may be initialized with the PCI 125 of the target cell. Scrambling of data may be the first step in a transmission. Conversely, the descrambling may be the last step in a reception. In both the scrambling and descrambling, the PCI 125 is used for scramble sequence initialization.

For example, for each codeword q, the block of bits $b^{(q)}(0), \ldots, b^{(q)}(M_{bit}^{(q)}-1)$ where $M_{bit}^{(q)}$ is the number of bits in codeword q transmitted on the physical channel in one subframe, may be scrambled prior to modulation, resulting in a block of scrambled bits $\tilde{b}^{(q)}(0), \ldots, \tilde{b}^{(q)}(M_{bit}^{(q)}-1)$ according to $\tilde{b}^{(q)}(i) = (b^{(q)}(i) + c^{(q)}(i)) \bmod 2$, where the scrambling sequence $c^{(q)}(i)$ is given by pseudo-random sequences defined below. The scrambling sequence generator may be initialized at the start of each subframe, where the initialization value of $c_{init}$ depends on the transport channel type according to $$c_{init} = \begin{cases} n_{RNTI} \cdot 2^{14} + q \cdot 2^{13} + \lfloor n_s/2 \rfloor \cdot 2^9 + N_{ID}^{cell} & \text{for } PDSCH \\ \lfloor n_s/2 \rfloor \cdot 2^9 + N_{ID}^{MBSFN} & \text{for } PMCH \end{cases} \text{ where } n_{RNTI}$$

corresponds to the radio network temporary identifier (RNTI) associated with the PDSCH transmission. $N_{ID}^{cell}$ is the physical-layer cell identity.

The pseudo-random sequences are defined by a length-31 Gold sequence. The output sequence c(n) of length $M_{PN}$, where n=0, 1, . . . , $M_{PN}$−1, is defined by $$c(n)=(x_1(n+N_C)+x_2(n+N_C)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2$$

where $N_C$=1600 and the first m-sequence shall be initialized with $x_1(0)=1, x_1(n)=0, n=1, 2, \ldots, 30$. The initialization of the second m-sequence is denoted by $c_{init}=\sum_{i=0}^{30} x_2(i) \cdot 2^i$ with the value depending on the application of the sequence.

The scrambling sequence of the PBCH may be initialized with $c_{init}=N_{ID}^{cell}$ in each radio frame fulfilling $n_f \bmod 4=0$. $n_f$ is a system frame number.

The scrambling sequence generator of the PCFICH may be initialized with $c_{init}=(\lfloor n_s/2 \rfloor+1) \cdot (2N_{ID}^{cell}+1) \cdot 2^9+N_{ID}^{cell}$ at the start of each subframe. The mapping to resource elements for the PCFICH is based on $N_{ID}^{cell}$.

The scrambling sequence generator of the PDCCH may be initialized with $c_{init}=\lfloor n_s/2 \rfloor 2^9+N_{ID}^{cell}$ at the start of each subframe. $n_s$ is a slot number within a radio frame. The mapping to resource elements for the PDCCH is based on $N_{ID}^{cell}$.

The scrambling sequence generator of the PHICH may be initialized with $c_{init}=(\lfloor n_s/2 \rfloor+1) \cdot (2N_{ID}^{cell}+1) \cdot 2^9+N_{ID}^{cell}$ at the start of each subframe. The mapping to resource elements for the PHICH is based on $N_{ID}^{cell}$.

The reference-signal sequence $r_{l,n_s}(m)$ of the CRS may be defined by $$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 2N_{RB}^{max,DL} - 1,$$

where $n_s$ is the slot number within a radio frame and l is the OFDM symbol number within the slot. The pseudo-random sequence generator may be initialized with $c_{init}=2^{10} \cdot (7 \cdot (n_s+1)+l+1) \cdot (2 \cdot N_{ID}^{cell}+1) \cdot 2 \cdot N_{ID}^{cell}+N_{CP}$ at the start of each OFDM symbol, where $$N_{CP} = \begin{cases} 1 & \text{for normal } CP \\ 0 & \text{for extended } CP \end{cases}.$$

The cell-specific frequency shift of the CRS may be based on $N_{ID}^{cell}$.

For antenna port 5, the UE-specific reference-signal sequence $r_{n_s}(m)$ associated with PDSCH may be defined by $$r_{n_s}(m) = \frac{1}{\sqrt{2}}(1 - 2 \cdot c(2m)) + j\frac{1}{\sqrt{2}}(1 - 2 \cdot c(2m+1)),$$

m=0, 1, . . . , $12N_{RB}^{PDSCH}-1$, where $N_{RB}^{PDSCH}$ denotes the bandwidth in resource blocks of the corresponding PDSCH transmission. The pseudo-random sequence generator may be initialized with $c_{init}=(\lfloor n_s/2 \rfloor+1) \cdot (2N_{ID}^{cell}+1) \cdot 2^{16}+n_{RNTI}$ at the start of each subframe.

For any of the antenna ports $p \in \{7, 8, \ldots, \nu+6\}$, the reference-signal sequence r(m) associated with PDSCH may be defined by $$r(m) = \frac{1}{\sqrt{2}}(1 - 2 \cdot c(2m)) + j\frac{1}{\sqrt{2}}(1 - 2 \cdot c(2m+1)),$$

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}.$$

The pseudo-random sequence generator may be initialized with $c_{init}=(\lfloor n_s/2 \rfloor+1) \cdot (2n_{ID}^{(nSCID)}+1) \cdot 2^{16}+n_{SCID}$ at the start of each subframe. The quantities $n_{ID}^{(i)}$, i=0, 1, are given by $n_{ID}^{(i)}=N_{ID}^{cell}$ if no value for $n_{id}^{DMRS,i}$ is provided by higher layers or if DCI format 1A, 2B or 2C is used for the DCI associated with the PDSCH transmission, or $n_{ID}^{(i)}=n_{ID}^{DMRS,i}$ otherwise.

The value of $n_{SCID}$ may be zero unless specified otherwise. For a PDSCH transmission on ports 7 or 8, $n_{SCID}$ may be given by the DCI format 2B, 2C or 2D associated with the PDSCH transmission.

The cell-specific frequency shift of the UE-specific reference signals associated with PDSCH may be based on $N_{ID}^{cell}$.

The reference-signal sequence $r_{l,n_s}(m)$ of the CSI reference signals may be defined by $$r_{l,n_s}(m) = \frac{1}{\sqrt{2}}(1 - 2 \cdot c(2m)) + j\frac{1}{\sqrt{2}}(1 - 2 \cdot c(2m+1)),$$

m=0, 1, . . . , $N_{RB}^{max,DL}-1$, where $n_s$ is the slot number within a radio frame and l is the OFDM symbol number within the slot. The pseudo-random sequence generator may be initialized with $c_{init}=2^{10} \cdot (7 \cdot (n_s+1)+l+1) (2 \cdot N_{ID}^{CSI}+1)+2 \cdot N_{ID}^{CSI}+N_{CP}$ at the start of each OFDM symbol, where $$N_{CP} = \begin{cases} 1 & \text{for normal } CP \\ 0 & \text{for extended } CP \end{cases}.$$

The quantity $N_{ID}^{CSI}$ may equal $N_{ID}^{cell}$ unless configured by higher layers.

Using the PCI 125, the UE SCell acquisition module 132 may then decode and read fundamental data and UE-specific data from the SCell via the physical channels and signals.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the eNB 160.

The UE operations module 124 may provide information 136 to the decoder 108. For example, the UE operations module 124 may inform the decoder 108 of an anticipated encoding for transmissions from the eNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the eNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the eNB 160. For instance, the one or more transmitters 158 may transmit during a UL subframe. The one or more transmitters 158 may upconvert and transmit the modulated signal(s) 156 to one or more eNBs 160.

The eNB 160 may include one or more transceivers 176, one or more demodulators 172, one or more decoders 166, one or more encoders 109, one or more modulators 113, one or more data buffers 162 and one or more eNB operations modules 182. For example, one or more reception and/or transmission paths may be implemented in an eNB 160. For convenience, only a single transceiver 176, decoder 166, demodulator 172, encoder 109 and modulator 113 are illustrated in the eNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data that may be used by the eNB operations module 182 to perform one or more operations.

In general, the eNB operations module 182 may enable the eNB 160 to communicate with the one or more UEs 102. The eNB operations module 182 may include one or more of an SCell parameter determination module 129 and an eNB SCell acquisition module 131.

The SCell parameter determination module 129 may determine the PCI 125 of an SCell that is on an unlicensed LTE carrier frequency. For example, the PCI 125 for each SCell that is associated with an eNB 160 may be configured by operation and maintenance (OAM) of the eNB 160. In some implementations, the PCI 125 assignments may be static or nearly static (e.g., the PCI 125 of an SCell may not change frequently). The SCell parameter determination module 129 may then include the PCI 125 in a physical cell identifier IE 123 that is sent to the UE 102. In one configuration, the physical cell identifier IE 123 may be included in an SCell addition IE.

The eNB SCell acquisition module 131 may apply the PCI 125 as a parameter for physical channels or signals on the SCell. For example, the eNB 160 may perform scramble sequence initialization with the UE 102 based on the PCI 125 of the SCell. Using the PCI 125, the eNB 160 may encode and transmit fundamental data and UE-specific data from the SCell.

The eNB SCell acquisition module 131 may assume that the UE 102 determines the PCI 125 of the SCell based on the physical cell identifier IE 123. Because the SCell is on an unlicensed LTE carrier frequency, the eNB 160 may not transmit the PSS and/or SSS on the SCell. Therefore, the UE 102 may instead obtain the PCI 125 of the SCell from on the physical cell identifier IE 123 sent by the eNB 160. For example, the UE 102 may determine that the SCell is on an unlicensed LTE carrier frequency based on the DL carrier frequency IE 127 or the indication sent to the UE 102. If the UE 102 determines that the SCell is on an unlicensed LTE carrier frequency, then the UE 102 may obtain the PCI 125 of the SCell from the physical cell identifier IE 123.

The eNB operations module 182 may provide information 190 to the one or more receivers 178. For example, the eNB operations module 182 may inform the receiver(s) 178 when or when not to receive transmissions from the UE(s) 102.

The eNB operations module 182 may provide information 188 to the demodulator 172. For example, the eNB operations module 182 may inform the demodulator 172 of a modulation pattern anticipated for transmissions from the UE(s) 102.

The eNB operations module 182 may provide information 186 to the decoder 166. For example, the eNB operations module 182 may inform the decoder 166 of an anticipated encoding for transmissions from the UE(s) 102.

The eNB operations module 182 may provide information 101 to the encoder 109. The information 101 may include data to be encoded and/or instructions for encoding. For example, the eNB operations module 182 may instruct the encoder 109 to encode transmission data 105 and/or other information 101.

The encoder 109 may encode transmission data 105 and/or other information 101 provided by the eNB operations module 182. For example, encoding the data 105 and/or other information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The eNB operations module 182 may provide information 192 to the one or more transmitters 117. This information 192 may include instructions for the one or more transmitters 117. For example, the eNB operations module 182 may instruct the one or more transmitters 117 when to (or when not to) transmit a signal to the UE(s) 102. In some implementations, this may be based on the UL/DL reconfiguration DCI. The one or more transmitters 117 may upconvert and transmit the modulated signal(s) 115 to one or more UEs 102.

It should be noted that a DL subframe may be transmitted from the eNB 160 to one or more UEs 102 and that a UL subframe may be transmitted from one or more UEs 102 to the eNB 160. Furthermore, both the eNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated (LSI) circuit or integrated circuit, etc.

Figure 2:
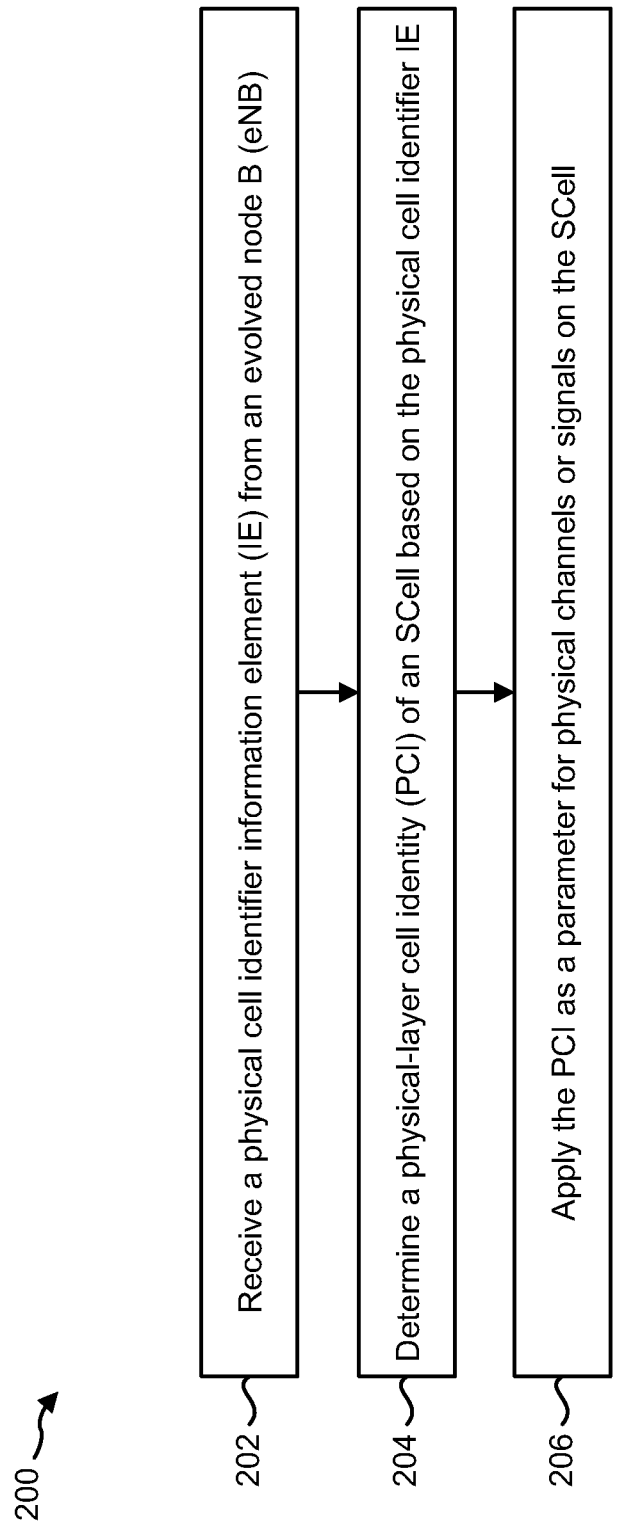
FIG. 2 is a flow diagram illustrating one implementation of a method for SCell ID selection by a UE.

FIG. 2 is a flow diagram illustrating one implementation of a method 200 for SCell ID selection by a UE 102. The method 200 may be performed by a UE 102 described above in connection with FIG. 1.

The UE 102 may receive 202 a physical cell identifier IE 123 from an eNB 160. The physical cell identifier IE 123 may be associated with an SCell that is on an unlicensed LTE carrier frequency. In one configuration, the physical cell identifier IE 123 may be included in an SCell addition IE. For example, the SCell addition IE may be an sCellToAddModList-r10 IE.

In one configuration, the SCell addition IE may be included in a radio resource control (RRC) connection reconfiguration message (e.g., RRCConnectionReconfiguration message) that is sent to the UE 102. The RRC connection reconfiguration message may be a command to modify an RRC connection. The RRC connection reconfiguration message may convey information for measurement configuration, mobility control and radio resource configuration (including radio bearers (RBs), MAC main configuration and physical channel configuration). This configuration may include associated dedicated Non-Access Stratum (NAS) information and security configuration.

The SCell addition IE may allow the UE 102 to obtain from a PCell the necessary information for the UE 102 to configure its receiver to tune an SCell in addition to the PCell. In one configuration, the physical cell identifier IE 123 may be a physCellId-r10 IE. The physical cell identifier IE 123 may provide the PCI 125 of the SCell.

The UE 102 may determine 204 the PCI 125 of the SCell based on the physical cell identifier IE 123. For example, the UE 102 may determine that the SCell is on an unlicensed LTE carrier frequency. In one configuration, the UE 102 may determine that the SCell is on an unlicensed LTE carrier frequency based on a DL carrier frequency IE 127 received from the eNB 160, as described in connection with FIG. 4. In another configuration, the UE 102 may determine that the SCell is on an unlicensed LTE carrier frequency based on an indication that the SCell is on an unlicensed LTE carrier frequency, as described in connection with FIG. 5.

If the UE 102 determines that the SCell is on an unlicensed LTE carrier frequency, then the UE 102 may obtain the PCI 125 of the SCell from the physical cell identifier IE 123. In other words, because the SCell is on an unlicensed LTE carrier frequency, the SCell may not transmit the PSS and/or SSS. Therefore, the UE 102 may instead obtain the PCI 125 of the SCell from on the physical cell identifier IE 123.

It should be noted that if the UE 102 determines that the SCell is on an unlicensed LTE carrier frequency, then the UE 102 may assume that no PSS or SSS are transmitted by the SCell. Alternatively, if the UE 102 determines that the SCell is on an unlicensed LTE carrier frequency, then the UE 102 may assume that PSS or SSS are transmitted by the SCell not at all defined occasions. Furthermore, the UE 102 may assume that the SCell and the PCell are synchronized at least in time.

The UE 102 may apply 206 the PCI 125 as a parameter for physical channels or signals on the SCell. For example, the UE 102 may perform scramble sequence initialization with the eNB 160 based on the PCI 125 of the SCell. Using the PCI 125, the UE 102 may then decode and read fundamental data and UE-specific data from the SCell.

Figure 3:
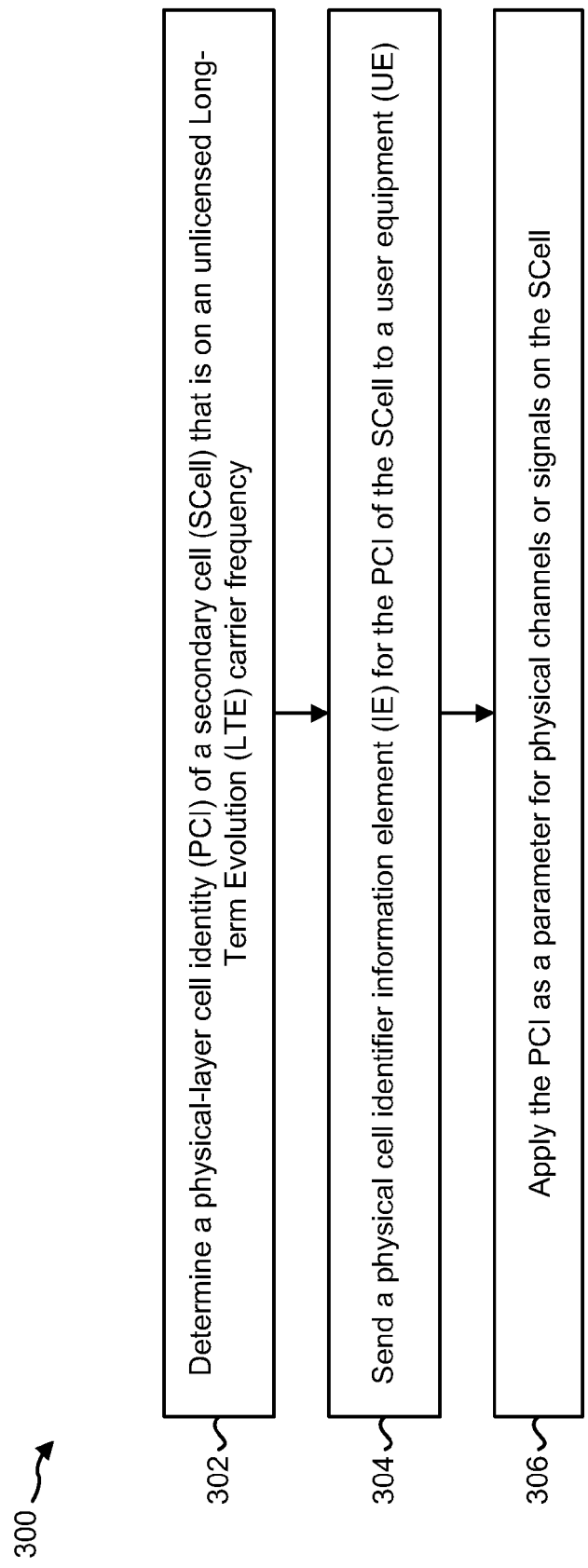
FIG. 3 is a flow diagram illustrating one implementation of a method for SCell ID selection by an eNB.

FIG. 3 is a flow diagram illustrating one implementation of a method 300 for SCell ID selection by an eNB 160. The eNB 160 may determine 302 a PCI 125 of an SCell that is on an unlicensed LTE carrier frequency. In one configuration, the eNB 160 does not transmit PSS and/or SSS on the SCell. In another configuration, the eNB 160 may disable transmitting PSS and/or SSS on the SCell at some occasions. Furthermore, the SCell and a PCell are synchronized at least in time.

The eNB 160 may send 304 a physical cell identifier IE 123 for the PCI 125 of the SCell to a UE 102. In one configuration, the physical cell identifier IE 123 may be included in an SCell addition IE. For example, the SCell addition IE may be an sCellToAddModList-r10 IE. In one configuration, the physical cell identifier IE 123 may be a physCellId-r10 IE. The PCI 125 of the SCell may be included in the physical cell identifier IE 123.

The eNB 160 may assume that the UE 102 determines that the SCell is on an unlicensed LTE carrier frequency. In one configuration, the eNB 160 may assume that the UE 102 determines that the SCell is on an unlicensed LTE carrier frequency based on a downlink (DL) carrier frequency IE 127 sent to the UE 102, as described in connection with FIG. 4. In another configuration, the eNB 160 may assume that UE 102 determines that the SCell is on an unlicensed LTE carrier frequency based on an indication sent by the eNB 160, as described in connection with FIG. 5.

The eNB 160 may assume that the UE 102 determines the PCI 125 of the SCell based on the physical cell identifier IE 123. If the UE 102 determines that the SCell is on an unlicensed LTE carrier frequency, then the UE 102 may obtain the PCI 125 of the SCell from the physical cell identifier IE 123. In other words, because the SCell is on an unlicensed LTE carrier frequency, the eNB 160 may not transmit the PSS and/or SSS on the SCell. Therefore, the UE 102 may instead obtain the PCI 125 of the SCell from on the physical cell identifier IE 123 sent by the eNB 160.

The eNB 160 may apply 306 the PCI 125 as a parameter for physical channels or signals on the SCell. For example, the eNB 160 may perform scramble sequence initialization with the UE 102 based on the PCI 125 of the SCell. Using the PCI 125, the eNB 160 may encode and transmit fundamental data and UE-specific data from the SCell.

Figure 4:
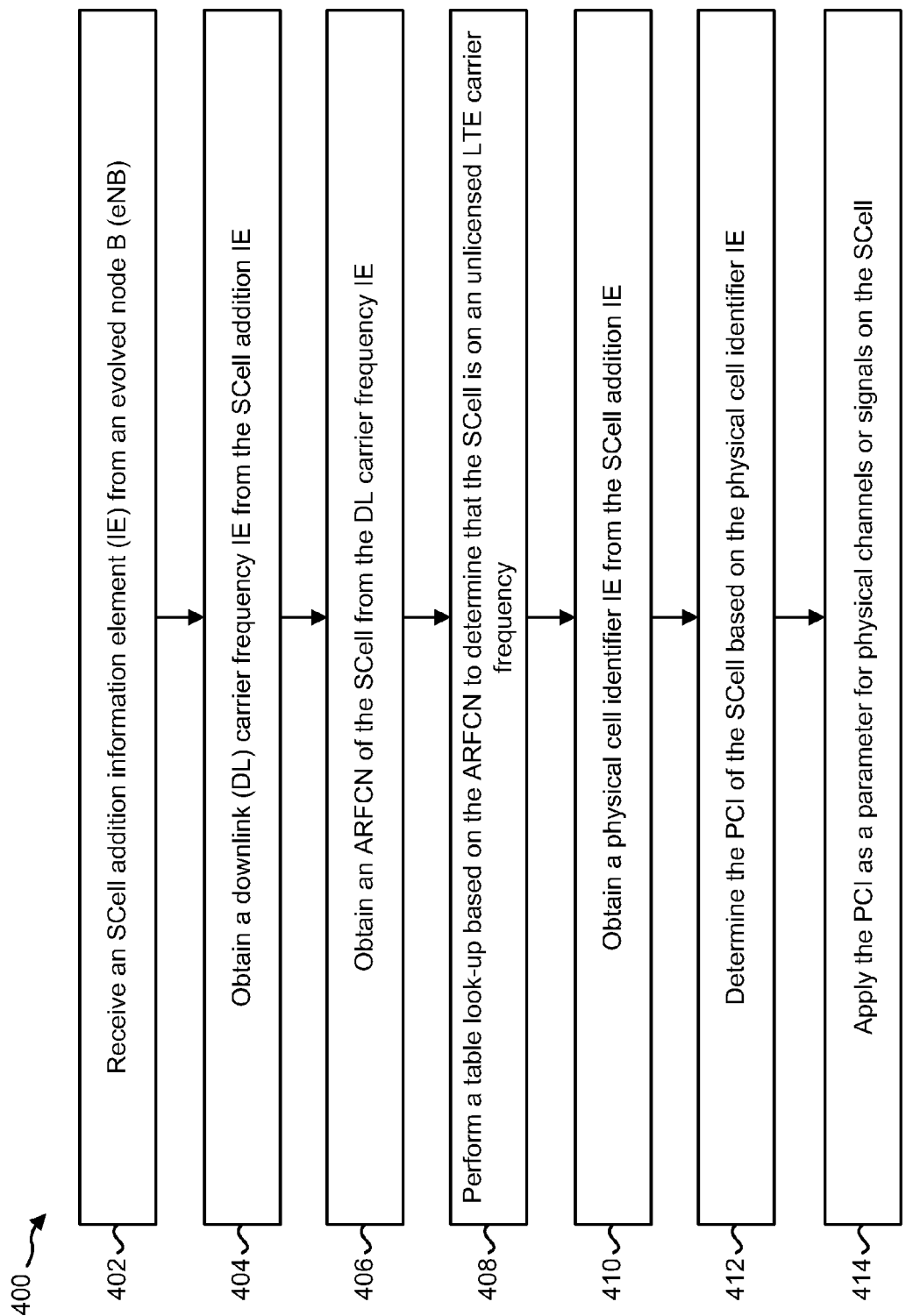
FIG. 4 is a flow diagram illustrating another implementation of a method for SCell ID selection by a UE.

FIG. 4 is a flow diagram illustrating another implementation of a method 400 for SCell ID selection by a UE 102. The method 400 may be performed by a UE 102 described above in connection with FIG. 1. The UE 102 may receive 402 an SCell addition IE from an eNB 160. In one configuration, the SCell addition IE may be an sCellToAddModList-r10 IE. The SCell addition IE may allow the UE 102 to obtain information from a PCell for the UE 102 to configure its receiver to tune an SCell in addition to the PCell.

The UE 102 may obtain 404 a DL carrier frequency IE 127 from the SCell addition IE. The DL carrier frequency IE 127 may be included in the SCell addition IE. In one configuration, the DL carrier frequency IE 127 may be a dl-Carrier- Freq-r10 IE or a dl-CarrierFreq-v1090 IE. In some configurations, the dl-CarrierFreq-v1090 IE may replace the dl-CarrierFreq-r10 IE. The dl-CarrierFreq-v1090 IE may provide a larger range of ARFCN values.

The UE 102 may obtain 406 the absolute radio frequency channel number (ARFCN) of the SCell from the DL carrier frequency IE 127. In one configuration, the DL carrier frequency IE 127 may include an ARFCN-ValueEUTRA parameter or an ARFCN-ValueEUTRA-v9e0 for the SCell. The ARFCN-ValueEUTRA may be used to indicate the ARFCN applicable for a downlink, uplink or bi-directional (TDD) E-UTRA carrier frequency. If an extension is signaled using the extended value range (as defined by ARFCN-ValueEUTRA-v9e0), the UE 102 may only consider this extension and may ignore the corresponding original field. The UE 102 may use the value range as defined by ARFCN-ValueEUTRA (i.e. without suffix, if signaled). In dedicated signaling, E-UTRAN may only provide an EARFCN corresponding to an E-UTRA band supported by the UE 102.

The UE 102 may perform 408 a table look-up based on the ARFCN to determine that the SCell is on an unlicensed LTE carrier frequency. For example, the UE 102 may include a look-up table that includes ARFCN values and the carrier frequency associated with the ARFCN values. Using the ARFCN obtained from the DL carrier frequency IE 127, the UE 102 may obtain the carrier frequency associated with the SCell from the look-up table. Therefore, the UE 102 may determine whether the ARFCN corresponds to an unlicensed LTE carrier frequency. For example, using the ARFCN of the SCell, the UE 102 may determine that the SCell resolves to an unlicensed LTE carrier frequency within the 2.4 GHz ISM or 5 GHz UNII bands.

If the UE 102 determines that the SCell is on an unlicensed LTE carrier frequency, then the UE 102 may assume that no PSS or SSS are transmitted by the SCell. Furthermore, the UE 102 may assume that the SCell and the PCell are synchronized at least in time.

The UE 102 may obtain 410 a physical cell identifier IE 123 from the SCell addition IE. The physical cell identifier IE 123 may be provided by the SCell addition IE. In one configuration, the physical cell identifier IE 123 may be a physCellId-r10 IE.

The UE 102 may determine 412 the PCI 125 of the SCell based on the physical cell identifier IE 123. In one configuration, the physical cell identifier IE 123 may include the PCI 125 of the SCell as an entry in a data field.

The UE 102 may apply 414 the PCI 125 as a parameter for physical channels or signals on the SCell. This may be accomplished as described above in connection with FIG. 2. For example, the UE 102 may perform scramble sequence initialization with the eNB 160 based on the PCI 125 of the SCell. Using the PCI 125, the UE 102 may then decode and read fundamental data and UE-specific data from the SCell.

Figure 5:
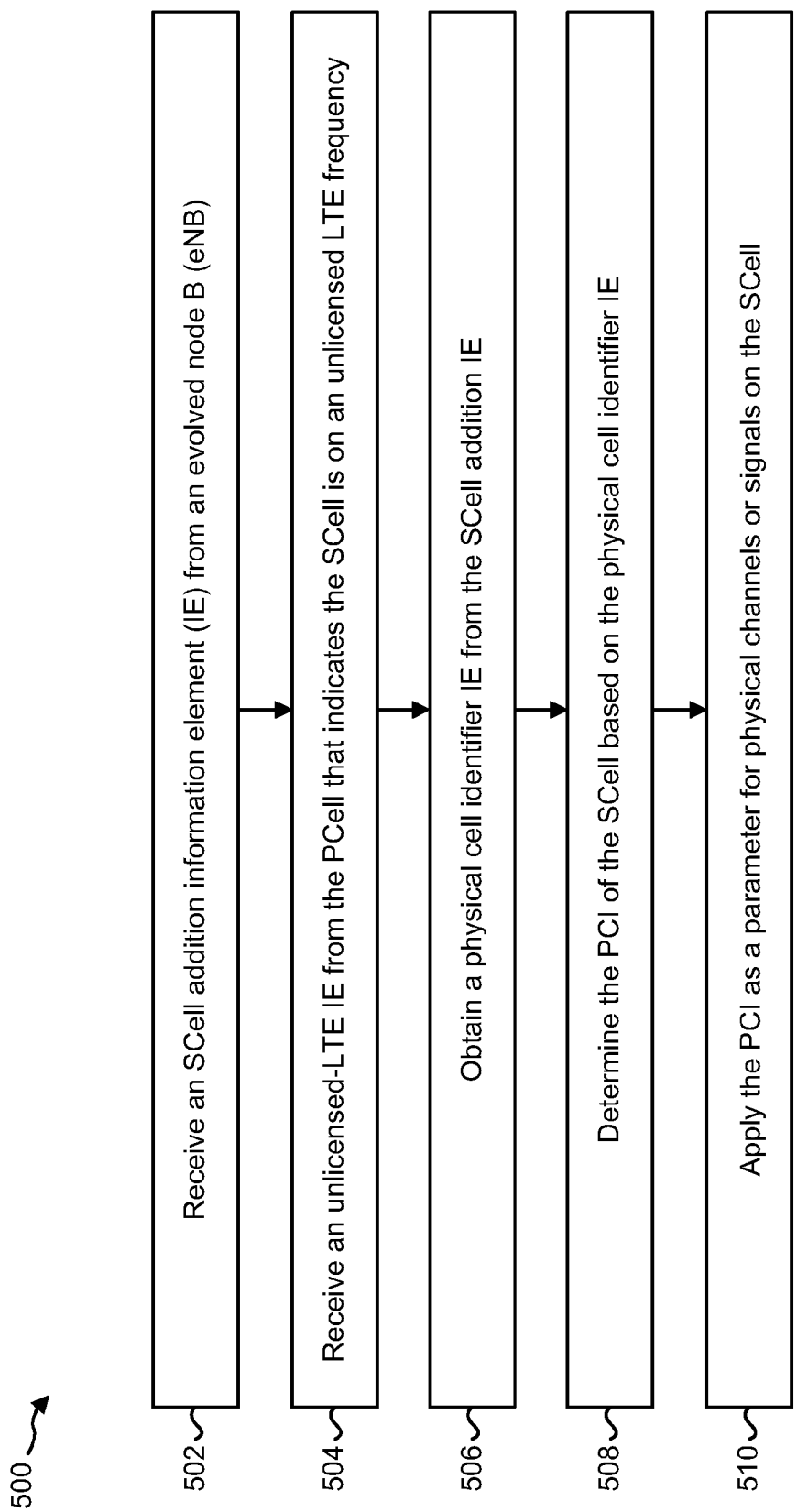
FIG. 5 is a flow diagram illustrating yet another implementation of a method for SCell ID selection by a UE.

FIG. 5 is a flow diagram illustrating yet another implementation of a method 500 for SCell ID selection by a UE 102. The method 500 may be performed by a UE 102 described above in connection with FIG. 1. The UE 102 may receive 502 an SCell addition IE from an eNB 160. In one configuration, the SCell addition IE may be an sCellToAddModList-r10 IE.

The UE 102 may receive 504 an indication from the eNB 160 that the SCell is on an unlicensed LTE frequency. For example, a new IE may be sent from the eNB 160 that indicates whether the SCell is on an unlicensed LTE frequency. In one configuration, the eNB 160 may determine that the UE 102 is in the proximity of the SCell. The eNB 160 may reconfigure the UE 102 (via an RRC connection reconfiguration message, for example) with the necessary information such that the UE 102 can tune to, and measure the SCell. The RRC connection reconfiguration message may be sent to the UE 102 via PDSCH on the PCell.

In one configuration, when the IE is set to TRUE, this indicates to the UE 102 that the SCell is on an unlicensed LTE frequency. Therefore, the UE 102 may determine that the SCell is on an unlicensed LTE carrier frequency based on receiving an indication that the SCell is on an unlicensed LTE carrier frequency.

The indication may further indicate to the UE 102 that the information included in the SCell addition IE is for a U-LTE SCell. Therefore, the UE 102 may assume that no PSS or SSS are transmitted by the SCell. Furthermore, the UE 102 may assume that the SCell and the PCell are synchronized at least in time.

The UE 102 may obtain 506 a physical cell identifier IE 123 from the SCell addition IE. The physical cell identifier IE 123 may be provided by the SCell addition IE. In one configuration, the physical cell identifier IE 123 may be a physCellId-r10 IE.

The UE 102 may determine 508 the PCI 125 of the SCell based on the physical cell identifier IE 123. In one configuration, the physical cell identifier IE 123 may include the PCI 125 of the SCell as an entry in a data field.

The UE 102 may apply 510 the PCI 125 as a parameter for physical channels or signals on the SCell. This may be accomplished as described above in connection with FIG. 2. For example, the UE 102 may perform scramble sequence initialization with the eNB 160 based on the PCI 125 of the SCell. Using the PCI 125, the UE 102 may then decode and read fundamental data and UE-specific data from the SCell.

Figure 6:
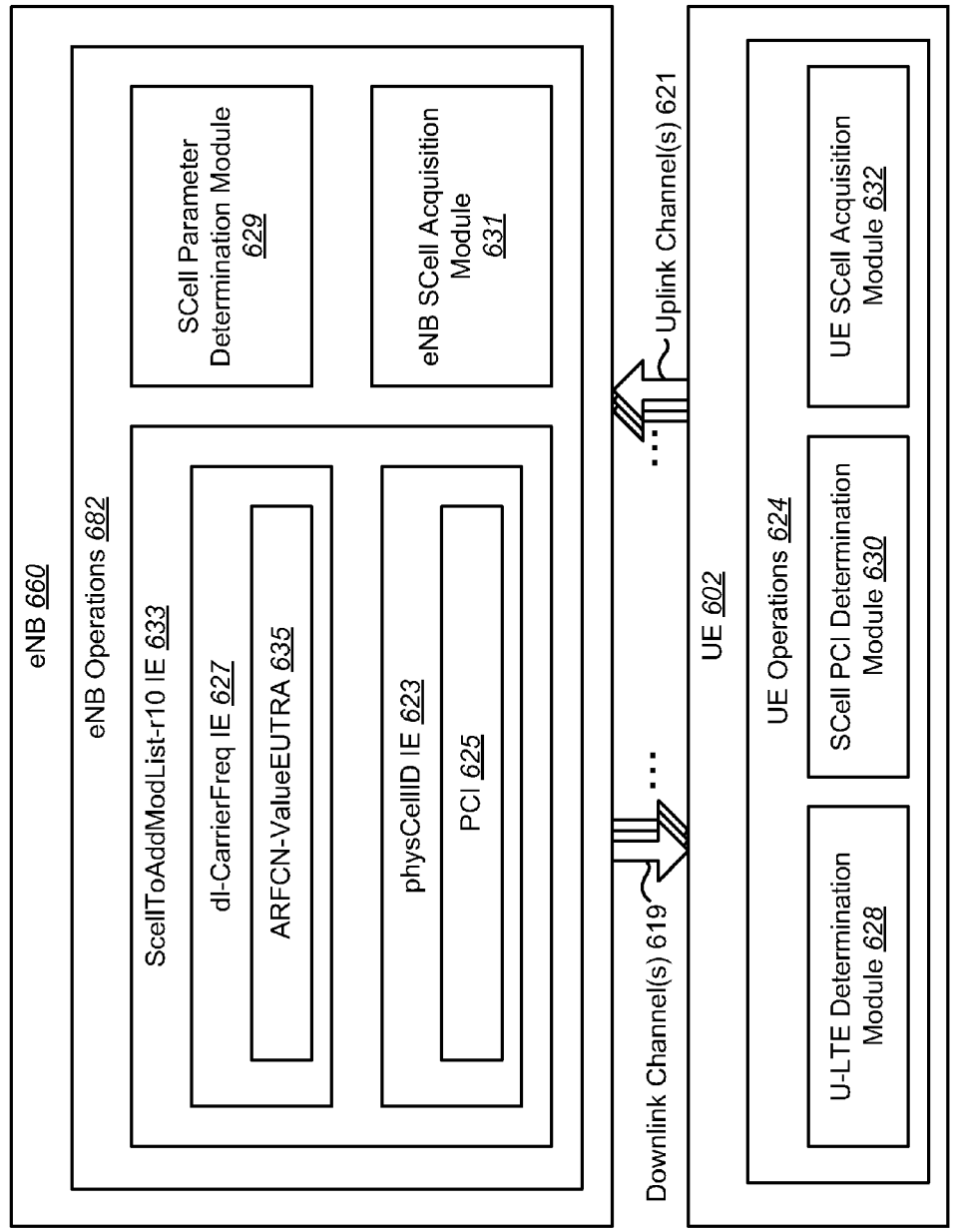
FIG. 6 is a block diagram illustrating a detailed configuration of an eNB and a UE for performing SCell ID selection.

FIG. 6 is a block diagram illustrating a detailed configuration of an eNB 660 and a UE 602 for performing SCell ID selection. The UE 602 and eNB 660 described in connection with FIG. 6 may be implemented in accordance with the UE 102 and eNB 160 described in connection with FIG. 1. For example, the UE 602 and the eNB 660 may use one or more channels 619, 621 to communicate with each other.

The eNB 660 may include an eNB operations module 682. In general, the eNB operations module 682 may enable the eNB 660 to communicate with one or more UEs 602. The eNB operations module 682 may include one or more of an SCell parameter determination module 629 and an eNB SCell acquisition module 631.

The SCell parameter determination module 629 may determine the PCI 625 of an SCell that is on an unlicensed LTE carrier frequency. The SCell parameter determination module 629 may include the PCI 625 in a physCellId IE 623.

The SCell parameter determination module 629 may also determine an ARFCN-ValueEUTRA 635 of the SCell. The ARFCN-ValueEUTRA 635 may be a table look-up value to identify the carrier frequency of the SCell. The ARFCN-ValueEUTRA 635 may be included in a dl-CarrierFreq IE 627. The dl-CarrierFreq IE 627 may be one of a dl-CarrierFreq-r10 IE or a dl-CarrierFreq-v1090 IE. The physCellId IE 623 and the dl-CarrierFreq IE 627 may be included in an sCellToAddModList-r10 IE 633 that is sent to the UE 602.

The eNB SCell acquisition module 631 may apply the PCI 625 as a parameter for physical channels or signals on the SCell. For example, the eNB 660 may perform scramble sequence initialization with the UE 602 based on the PCI 625 of the SCell. Using the PCI 625 of the SCell, the eNB 660 may encode and transmit fundamental data and UE-specific data from the SCell.

The UE operations module 624 may enable the UE 602 to communicate with the eNB 660. The UE operations module 624 may include one or more of a U-LTE determination module 628, an SCell PCI determination module 630 and a UE SCell acquisition module 632.

The U-LTE determination module 628 may determine whether an SCell is on an unlicensed LTE carrier frequency. In one configuration, the U-LTE determination module 628 may determine that the SCell is on an unlicensed LTE carrier frequency based on the dl-CarrierFreq IE 627 received from the eNB 660. The U-LTE determination module 628 may obtain the ARFCN-ValueEUTRA 635 of the SCell from the dl-CarrierFreq IE 627. The U-LTE determination module 628 may then perform a table look-up using the ARFCN-ValueEUTRA 635 of the SCell to determine whether the SCell is on an unlicensed LTE carrier frequency.

In another configuration, the U-LTE determination module 628 may determine that the SCell is on an unlicensed LTE carrier frequency based on an indication received from the eNB 660. The indication may be an information element that indicates that the SCell is on an unlicensed LTE carrier frequency.

The SCell PCI determination module 630 may determine the PCI 625 of the SCell based on the physCellId IE 623. The SCell PCI determination module 630 may obtain the physCellId IE 623 from sCellToAddModList-r10 IE 633 sent from the eNB 660. If the U-LTE determination module 628 determines that the SCell is on an unlicensed LTE carrier frequency, then the SCell PCI determination module 630 may obtain the PCI 625 of the SCell from the physCellId IE 623.

The UE SCell acquisition module 632 may apply the PCI 625 as a parameter for physical channels or signals on the SCell. For example, the UE SCell acquisition module 632 may perform scramble sequence initialization with the eNB 660 based on the PCI 625 of the SCell. Using the PCI 625, the UE SCell acquisition module 632 may then decode and read fundamental data and UE-specific data from the SCell.

Figure 7:
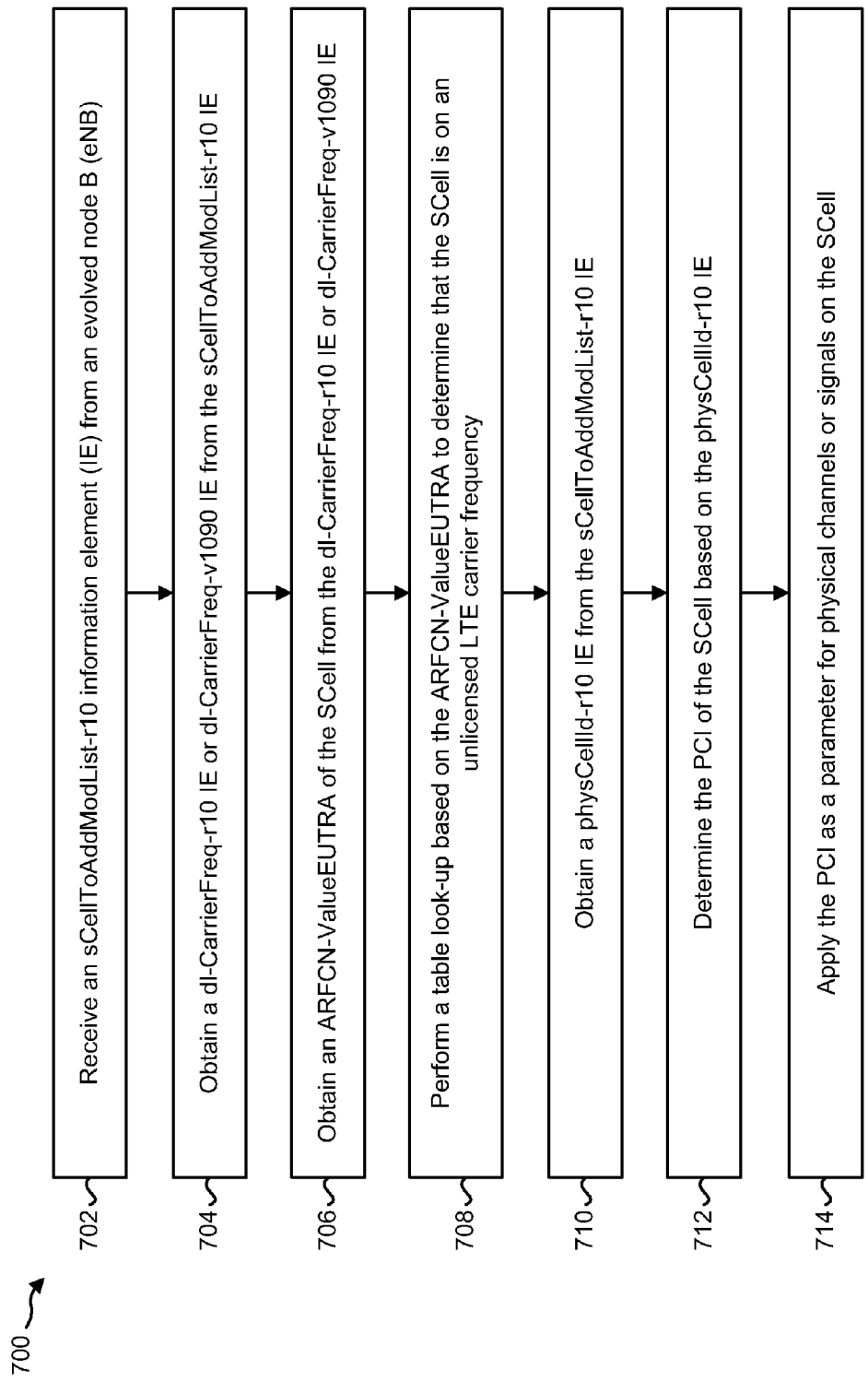
FIG. 7 is a flow diagram illustrating a more detailed implementation of a method for SCell ID selection by a UE.

FIG. 7 is a flow diagram illustrating a more detailed implementation of a method 700 for SCell ID selection by a UE 602. The method 700 may be performed by a UE 602 described above in connection with FIG. 6. The UE 602 may receive 702 an sCellToAddModList-r10 IE 633 from an eNB 660. The sCellToAddModList-r10 IE 633 may allow the UE 602 to obtain information from a PCell for the UE 602 to configure its receiver to tune an SCell in addition to the PCell.

The UE 602 may obtain 704 a dl-CarrierFreq IE 627 from the SCell addition IE. The dl-CarrierFreq IE 627 may be one of a dl-CarrierFreq-r10 IE or a dl-CarrierFreq-v1090 IE. The dl-CarrierFreq IE 627 may be included in the sCellToAddModList-r10 IE 633.

The UE 602 may obtain 706 the ARFCN-ValueEUTRA 635 of the SCell from the dl-CarrierFreq IE 627. The ARFCN-ValueEUTRA 635 may be a table look-up value to identify the carrier frequency of the SCell. The UE 602 may perform 708 a table look-up based on the ARFCN-ValueEUTRA 635 to determine that the SCell is on an unlicensed LTE carrier frequency. For example, using the ARFCN-ValueEUTRA 635, the UE 602 may obtain the carrier frequency associated with the SCell from a look-up table. Therefore, the UE 602 may determine whether the ARFCN-ValueEUTRA 635 corresponds to an unlicensed LTE carrier frequency.

The UE 602 may obtain 710 a physCellId IE 623 from the sCellToAddModList-r10 IE 633. The UE 602 may determine 712 the PCI 625 of the SCell based on the physCellId IE 623. In one configuration, the physCellId IE 623 may include the PCI 625 of the SCell as an entry in a data field.

The UE 602 may apply 714 the PCI 625 as a parameter for physical channels or signals on the SCell. For example, the UE 602 may perform scramble sequence initialization with the eNB 660 based on the PCI 625 of the SCell. Using the PCI 625, the UE 602 may then decode and read fundamental data and UE-specific data from the SCell.

Figure 8:
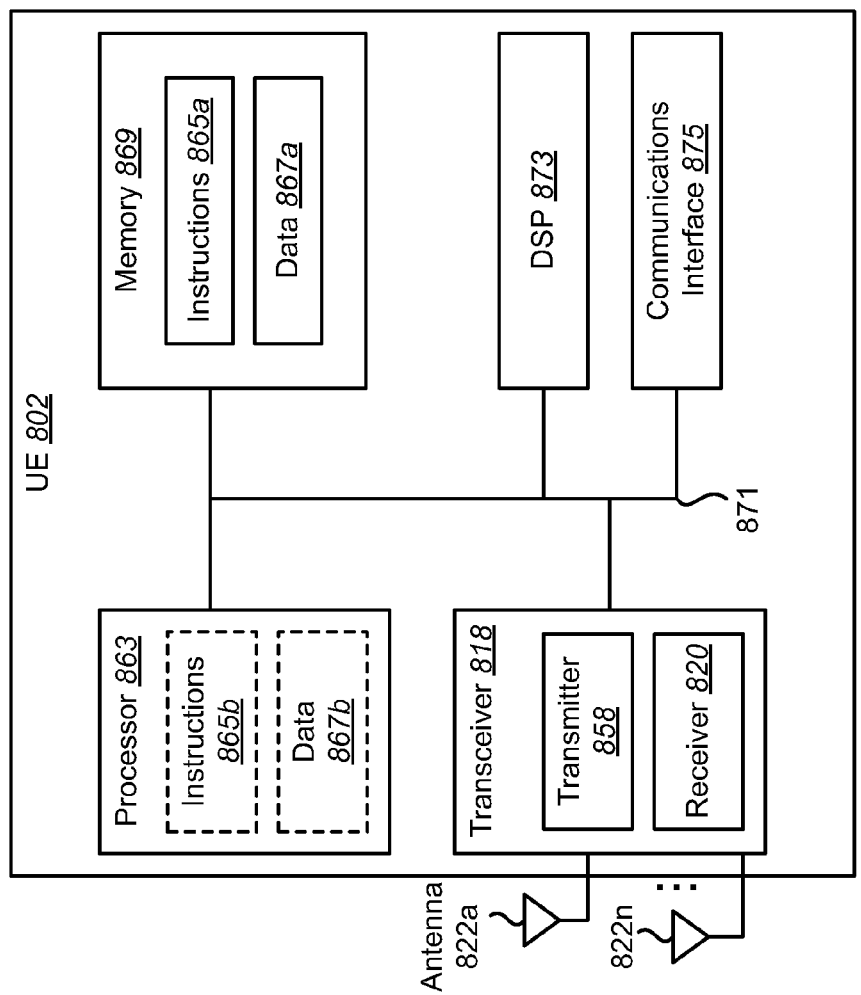
FIG. 8 illustrates various components that may be utilized in a UE.

FIG. 8 illustrates various components that may be utilized in a UE 802. The UE 802 described in connection with FIG. 8 may be implemented in accordance with the UE 102 described in connection with FIG. 1 and/or the UE 602 described in connection with FIG. 6. The UE 802 includes a processor 863 that controls operation of the UE 802. The processor 863 may also be referred to as a central processing unit (CPU). Memory 869, which may include read-only memory (ROM), random access memory (RAM), a combination of the two or any type of device that may store information, provides instructions 865a and data 867a to the processor 863. A portion of the memory 869 may also include non-volatile random access memory (NVRAM). Instructions 865b and data 867b may also reside in the processor 863. Instructions 865b and/or data 867b loaded into the processor 863 may also include instructions 865a and/or data 867a from memory 869 that were loaded for execution or processing by the processor 863. The instructions 865b may be executed by the processor 863 to implement one or more of the methods 200, 400, 500 and 700 described above.

The UE 802 may also include a housing that contains one or more transmitters 858 and one or more receivers 820 to allow transmission and reception of data. The transmitter(s) 858 and receiver(s) 820 may be combined into one or more transceivers 818. One or more antennas 822a-n are attached to the housing and electrically coupled to the transceiver 818.

The various components of the UE 802 are coupled together by a bus system 871, which may include a power bus, a control signal bus and a status signal bus, in addition to a data bus. However, for the sake of clarity, the various buses are illustrated in FIG. 8 as the bus system 871. The UE 802 may also include a digital signal processor (DSP) 873 for use in processing signals. The UE 802 may also include a communications interface 875 that provides user access to the functions of the UE 802. The UE 802 illustrated in FIG. 8 is a functional block diagram rather than a listing of specific components.

Figure 9:
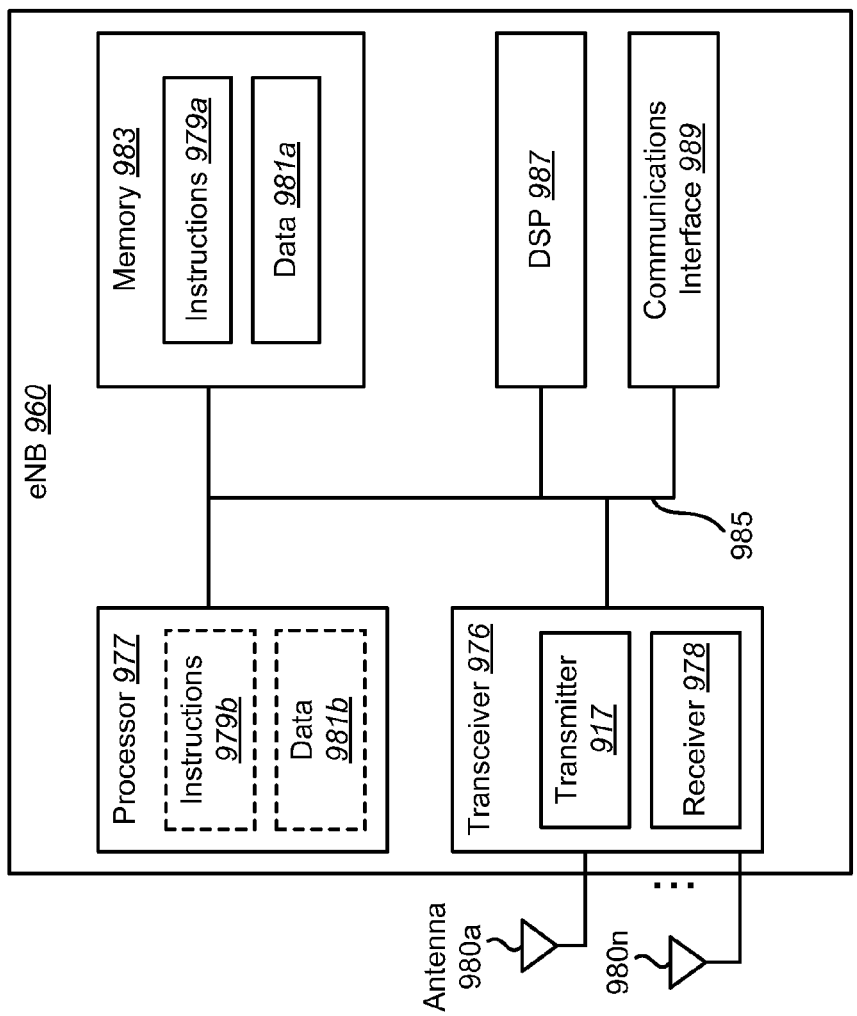
FIG. 9 illustrates various components that may be utilized in an eNB.

FIG. 9 illustrates various components that may be utilized in an eNB 960. The eNB 960 described in connection with FIG. 9 may be implemented in accordance with the eNB 160 described in connection with FIG. 1. The eNB 960 includes a processor 977 that controls operation of the eNB 960. The processor 977 may also be referred to as a central processing unit (CPU). Memory 983, which may include read-only memory (ROM), random access memory (RAM), a combination of the two or any type of device that may store information, provides instructions 979a and data 981a to the processor 977. A portion of the memory 983 may also include non-volatile random access memory (NVRAM). Instructions 979b and data 981b may also reside in the processor 977. Instructions 979b and/or data 981b loaded into the processor 977 may also include instructions 979a and/or data 981a from memory 983 that were loaded for execution or processing by the processor 977. The instructions 979b may be executed by the processor 977 to implement method 300 described above.

The eNB 960 may also include a housing that contains one or more transmitters 917 and one or more receivers 978 to allow transmission and reception of data. The transmitter(s) 917 and receiver(s) 978 may be combined into one or more transceivers 976. One or more antennas 980a-n are attached to the housing and electrically coupled to the transceiver 976.

The various components of the eNB 960 are coupled together by a bus system 985, which may include a power bus, a control signal bus and a status signal bus, in addition to a data bus. However, for the sake of clarity, the various buses are illustrated in FIG. 9 as the bus system 985. The eNB 960 may also include a digital signal processor (DSP) 987 for use in processing signals. The eNB 960 may also include a communications interface 989 that provides user access to the functions of the eNB 960. The eNB 960 illustrated in FIG. 9 is a functional block diagram rather than a listing of specific components.

Figure 10:
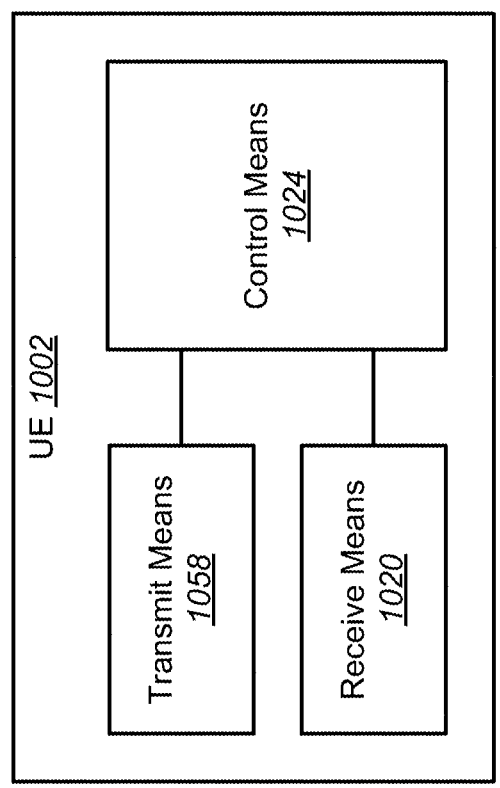
FIG. 10 is a block diagram illustrating one configuration of a UE in which systems and methods for feedback reporting may be implemented.

FIG. 10 is a block diagram illustrating one configuration of a UE 1002 in which systems and methods for feedback reporting may be implemented. The UE 1002 includes transmit means 1058, receive means 1020 and control means 1024. The transmit means 1058, receive means 1020 and control means 1024 may be configured to perform one or more of the functions described in connection with FIG. 2, FIG. 4, FIG. 5 and FIG. 7 above. FIG. 8 above illustrates one example of a concrete apparatus structure of FIG. 10. Other various structures may be implemented to realize one or more of the functions of FIG. 2, FIG. 4, FIG. 5 and FIG. 7. For example, a DSP may be realized by software.

Figure 11:
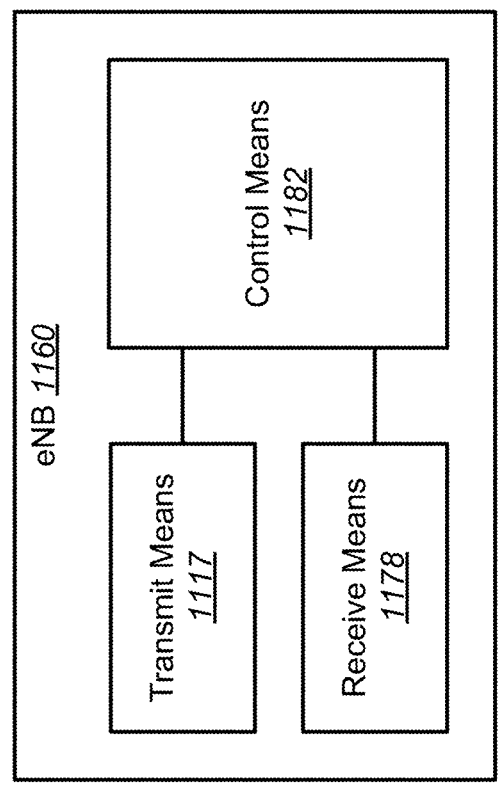
FIG. 11 is a block diagram illustrating one configuration of an eNB in which systems and methods for feedback reporting may be implemented.

FIG. 11 is a block diagram illustrating one configuration of an eNB 1160 in which systems and methods for feedback reporting may be implemented. The eNB 1160 includes transmit means 1117, receive means 1178 and control means 1182. The transmit means 1117, receive means 1178 and control means 1182 may be configured to perform one or more of the functions described in connection with FIG. 3 above. FIG. 9 above illustrates one example of a concrete apparatus structure of FIG. 11. Other various structures may be implemented to realize one or more of the functions of FIG. 3. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, Electrically Erasable Programmable Read-Only Memory (EEPROM), Compact Disc Read-Only Memory (CD-ROM) or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method performed by a user equipment (UE), comprising:
   receiving a physical cell identifier information element (IE) from an evolved node B (eNB), wherein the physical cell identifier IE is associated with a secondary cell (SCell) that is on an unlicensed Long-Term Evolution (LTE) carrier frequency;
   determining a physical-layer cell identity (PCI) of the SCell based on the physical cell identifier IE; and
   applying the PCI as a parameter for physical channels or signals on the SCell;
   wherein the UE assumes:
   primary synchronization signal (PSS) and secondary synchronization signal (SSS) in a primary cell (PCell) are transmitted every 5 milliseconds, and
   PSS and SSS in the SCell are not transmitted every 5 milliseconds but only in some occasions.

2. The method of claim 1, further comprising determining that the SCell is on an unlicensed LTE carrier frequency based on a downlink carrier frequency IE received from the eNB.

3. The method of claim 2, further comprising obtaining an absolute radio frequency channel number (ARFCN) of the SCell from the downlink carrier frequency IE, the ARFCN corresponding to an unlicensed LTE carrier frequency.

4. The method of claim 2, wherein the physical cell identifier IE is a physCellId-r10 IE, wherein the downlink carrier frequency IE is one of a dl-CarrierFreq-r10 IE or a dl-CarrierFreq-v 1090 IE, and wherein the physical cell identifier IE and the downlink carrier frequency IE are included in an sCellToAddModList-r10 IE.

5. The method of claim 1, further comprising determining that the SCell is on an unlicensed LTE carrier frequency based on receiving an IE from the eNB based on an indication that the SCell is on an unlicensed LTE carrier frequency.

6. The method of claim 1, wherein determining the PCI of the SCell comprises obtaining the PCI of the SCell from the physical cell identifier IE.

7. The method of claim 1, wherein applying the PCI as a parameter for physical channels or signals on the SCell comprises performing scramble sequence initialization based on the PCI of the SCell.

8. A method performed by an evolved node B (eNB), comprising:
   determining a physical-layer cell identity (PCI) of a secondary cell (SCell) that is on an unlicensed Long-Term Evolution (LTE) carrier frequency;
   sending a physical cell identifier information element (IE) for the PCI of the SCell to a user equipment (UE); and
   applying the PCI as a parameter for physical channels or signals on the SCell;
   wherein the eNB assumes that the UE assumes:
   primary synchronization signal (PSS) and secondary synchronization signal (SSS) in a primary cell (PCell) are transmitted every 5 milliseconds, and
   PSS and SSS in the SCell are not transmitted every 5 milliseconds but only in some occasions.

9. The method of claim 8, further comprising assuming that the UE determines that the SCell is on an unlicensed LTE carrier frequency based on a downlink carrier frequency IE sent to the UE.

10. The method of claim 9, further comprising obtaining an ARFCN of the SCell from the downlink carrier frequency IE, the ARFCN corresponding to an unlicensed LTE carrier frequency.

11. The method of claim 9, wherein the physical cell identifier IE is a physCellId-r10 IE, wherein the downlink carrier frequency IE is one of a dl-CarrierFreq-r10 IE or a dl-CarrierFreq-v 1090 IE, and wherein the physical cell identifier IE and the downlink carrier frequency IE are included in an sCellToAddModList-r10 IE.

12. The method of claim 8, further comprising sending to the UE an indication that the SCell is on an unlicensed LTE carrier frequency.

13. The method of claim 8, wherein the PCI of the SCell is comprised in the physical cell identifier IE.

14. The method of claim 8, wherein applying the PCI as a parameter for physical channels or signals on the SCell comprises performing scramble sequence initialization based on the PCI of the SCell.

15. A user equipment (UE), comprising:
a processor; and
memory in electronic communication with the processor, wherein instructions stored in the memory are executable to:
receive a physical cell identifier information element (IE) from an evolved node B (eNB), wherein the physical cell identifier IE is associated with a secondary cell (SCell) that is on an unlicensed Long-Term Evolution (LTE) carrier frequency;
determine a physical-layer cell identity (PCI) of the SCell based on the physical cell identifier IE; and
apply the PCI as a parameter for physical channels or signals on the SCell;
wherein the UE assumes:
primary synchronization signal (PSS) and secondary synchronization signal (SSS) in a primary cell (PCell) are transmitted every 5 milliseconds, and
PSS and SSS in the SCell are not transmitted every 5 milliseconds but only in some occasions.

16. The UE of claim 15, further comprising instructions executable to determine that the SCell is on an unlicensed LTE carrier frequency based on a downlink carrier frequency IE received from the eNB.

17. The UE of claim 16, further comprising instructions executable to obtain an absolute radio frequency channel number (ARFCN) of the SCell from the downlink carrier frequency IE, the ARFCN corresponding to an unlicensed LTE carrier frequency.

18. The UE of claim 15, further comprising instructions executable to determine that the SCell is on an unlicensed LTE carrier frequency based on receiving an IE from the eNB based on an indication that the SCell is on an unlicensed LTE carrier frequency.

19. The UE of claim 15, wherein the instructions executable to determine the PCI of the SCell comprise instructions executable to obtain the PCI of the SCell from the physical cell identifier IE.

20. The UE of claim 15, wherein the instructions executable to apply the PCI as a parameter for physical channels or signals on the SCell comprise instructions executable to perform scramble sequence initialization based on the PCI of the SCell.

21. An evolved node B (eNB), comprising:
a processor; and
memory in electronic communication with the processor, wherein instructions stored in the memory are executable to:
determine a physical-layer cell identity (PCI) of a secondary cell (SCell) that is on an unlicensed Long-Term Evolution (LTE) carrier frequency;
send a physical cell identifier information element (IE) for the PCI of the SCell to a user equipment (UE); and
apply the PCI as a parameter for physical channels or signals on the SCell;
wherein the eNB assumes that the UE assumes:
primary synchronization signal (PSS) and secondary synchronization signal (SSS) in a primary cell (PCell) are transmitted every 5 milliseconds, and
PSS and SSS in the SCell are not transmitted every 5 milliseconds but only in some occasions.

22. The eNB of claim 21, further comprising instructions executable to assume that the UE determines that the SCell is on an unlicensed LTE carrier frequency based on a downlink carrier frequency IE sent to the UE.

23. The eNB of claim 21, further comprising instructions executable to send to the UE an indication that the SCell is on an unlicensed LTE carrier frequency.

24. The eNB of claim 21, wherein the PCI of the SCell is comprised in the physical cell identifier IE.

25. The eNB of claim 21, wherein the instructions executable to apply the PCI as a parameter for physical channels or signals on the SCell comprise instructions executable to perform scramble sequence initialization based on the PCI of the SCell.

* * * * *